(12) United States Patent
Kudoh et al.

(10) Patent No.: US 6,353,583 B1
(45) Date of Patent: Mar. 5, 2002

(54) SIGNAL OPERATIONAL CIRCUIT FOR A MULTI-BEAM PICK-UP DEVICE

(75) Inventors: Ryuuji Kudoh, Kanagawa-ken; Tatsuaki Sakurai; Masaaki Sofue, both of Tokyo, all of (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/259,258

(22) Filed: Mar. 1, 1999

(30) Foreign Application Priority Data

Mar. 2, 1998 (JP) .......................................... 10-049157

(51) Int. Cl.$^7$ ................................................. G11B 7/13
(52) U.S. Cl. ................ 369/44.41; 369/44.29; 369/44.35
(58) Field of Search ........................... 369/44.11, 44.27, 369/44.28, 44.29, 44.32, 44.34, 44.35, 44.41, 44.42, 47.1, 53.1, 124.01, 124.1, 124.12

(56) References Cited

U.S. PATENT DOCUMENTS

| | | | | |
|---|---|---|---|---|
| 5,812,505 A | * | 9/1998 | Shimoda et al. ..... | 369/44.41 X |
| 5,815,473 A | * | 9/1998 | Takahashi et al. ... | 369/44.41 X |
| 5,859,819 A | * | 1/1999 | Miyabe et al. ........... | 369/44.41 |
| 5,914,925 A | * | 6/1999 | Lee et al. ................ | 369/44.41 |

* cited by examiner

*Primary Examiner*—Muhammad Edun
(74) *Attorney, Agent, or Firm*—Dickstein Shapiro Morin & Oshinsky LLP

(57) ABSTRACT

The present invention provides a large scale integrated circuit (LSI) for calculating servo signals (e.g., a focusing signal, a tracking signal, etc.) from the output signals received from a plurality of photo detectors, as used within an optical disk apparatus. The invention provides a switching circuit and a gain changing circuit coupled to the LSI such that a single LSI may be used for at least two different photo detector configurations as may be found in at least two different pick-up devices.

26 Claims, 7 Drawing Sheets

SIGNAL OPERATIONAL CIRCUIT FOR A MULTI-BEAM PICK-UP DEVICE

BACKGROUND OF THE INVENTION

1. Field of the Invention

The present invention relates to the field of optical disk drives. More specifically, it relates to an analog signal operational large scale integrated circuit (LSI) for a multi-beam pick-up device which can be used to process signals from two or more kinds of pick-up devices, each of the pick-up devices having a different arrangement of photo detectors.

2. Description of the Related Art

In the conventional optical disc drive for recording, reproducing and erasing information on a CD-R disc and a CD-RW disc, a pick-up device which receives a laser ray has a plurality of photo detectors. The pick-up device receives output signals from the photo detectors in an operation circuit and calculates a reproducing signal (RF), a focusing error signal (FE), a tracking error signal (TE), a lens positional signal (LP), a track cross signal (TC), a push-pull signal and so on. The pick-up device uses a photo diode (PD) as a photoelectric converter. Since output impedance of the photo diode is high, if the transmission line is long, its measurements are easily influenced by outside noise and the floating capacity of the signal line. Therefore, an Optical Element Integrated Circuit (OEIC) is formed in which a plurality of photo detectors are arranged in a plane and the PD output current signals are converted into an output voltage signal.

With regard to the arrangement of the plurality of photo detectors of the pick-up device, at least two different photo detector arrangements for pick-up devices are often used. Based upon the output signals of respective photo detectors of the pick-up devices, the above mentioned signals (i.e., the reproducing signal (RF), focusing error signal (FE), tracking error signal (TE), lens positional signal (LP), track cross signal (TC), push-pull signal, etc.) are arrived at by arithmetic operation. For example, in both pick-up devices, eight photo detectors are provided (A, B, C, D, E, F, G, H), and they are arranged in a different pattern in each pick-up device. For example, one pick-up device calculates the focusing error signal by the operational expression "$\{(A+D)-(B+C)\}/(A+B+C+D)$," the other pick-up device calculates the focusing error signal by the operational expression "$(A-B)/(A+B)$." Other signals are calculated by using different expressions.

For each pick-up device having a different photo detector arrangement, its respective calculating circuit is also different. Such calculating circuits generally comprise LSIs. Since, as described above, a special calculating circuit is formed for respective pick-up devices, according to its specific pick-up methods, it is necessary to provide a specific LSI for each pick-up device.

OEIC photo detectors have approximately the same gain. Therefore, LSIs having different gains, in response to OEIC gain levels, must be manufactured.

SUMMARY OF THE INVENTION

In accordance with an embodiment of the present invention, an analog signal operational LSI for use in an optical disc apparatus is provided. The analog signal operational LSI has switching circuits which are provided with a calculating circuit for calculating servo signals (e.g., focusing signal, tracking signal, etc.) based on output signals received from a plurality of photo detectors and from an input portion of the LSI. The configuration of the switching circuits are variable such that the calculating of the servo signal of the LSI can adapt to the differing calculating expressions of each respective pick-up device with which the LSI can be used. That is, since there are two or more kinds of pick-up devices, each having a different arrangement of its photo detectors, so too must the switching circuits be different which receive output signals from the pick-up devices. The LSI provides the proper servo signals no matter which pick-up device it is used with.

In accordance with an embodiment of the present invention, a gain changing circuit is also provided. An output portion of the gain changing circuit is coupled to the analog signal operational LSI. Also, in accordance with an embodiment of the present invention, the gain changing circuit has two steps of reproducing, recording and erasing for each disc.

The present invention provides for a single LSI which can adapt to two differing pick-up devices by changing the switching circuit. Furthermore, even though there is no gain changing function within a pick-up device the present invention properly utilizes the output signals of each pick-up device and easily adjusts for variances within each disc.

BRIEF DESCRIPTION OF THE DRAWINGS

These and other advantages and features of the invention will be more clearly understood from the following detailed description of the invention which is provided in connection with the accompanying drawings in which.

DETAILED DESCRIPTION OF PREFERRED EMBODIMENTS

Preferred embodiments of the present invention will next be described with reference to FIGS. 1–8. Other embodiments may be realized and structural, or logical changes may be made to the disclosed embodiment without departing from the spirit or scope of the present invention.

Figure 1:
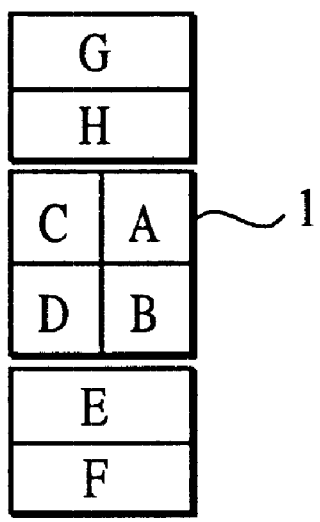
FIG. 1 depicts a first arrangement of photo detectors for a first pick-up device.
Figure 2:
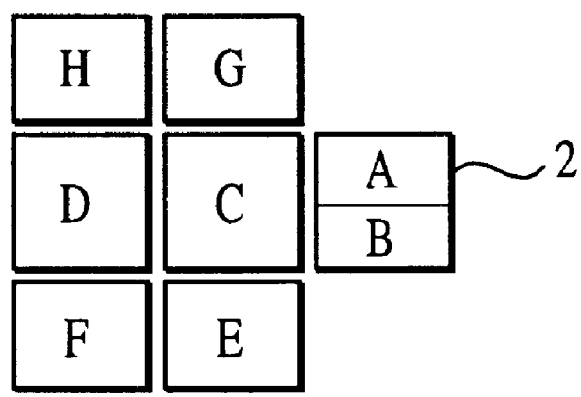
FIG. 2 depicts a second arrangement of photo detectors for a second pick-up device.

FIG. 1 depicts a first arrangement of photo detectors of a first pick-up device (PU1), FIG. 2 depicts a second arrangement of photo detectors of a second pick-up device (PU2). Each of the two pick-up devices PU1, PU2 comprise eight photo detectors A, B, C, D, E, F, G, H, the arrangement of the photo detectors being different for each pick-up device. Because of the different photo detector arrangements for each pick-up device, the detecting method of each pick-up device is different and also the calculating expressions are different.

As depicted in FIG. 1, photo detectors A, B, C, D are arranged in center square area, photo detectors E, F are arranged beneath A, B, C, D, and photo detectors G, H are arranged above A, B, C, D.

As depicted in FIG. 2, photo detectors A, B are arranged in an up and down configuration, photo detectors C, D are arranged adjacent to them. Photo detectors E, F are respectively arranged beneath photo detectors C, D, and photo detectors G, H are respectively arranged above photo detectors C, D.

Output signals of each pick-up device are entered into a series of equations for obtaining a reproducing signal (RE), a focusing error signal (FE), a tracking error signal (TE), a lens positional signal (LP), a track cross signal (TC), and a push-pull signal (PP). Assuming, for our purposes, the respective output of each photo detector A, B, C, D, E, F, G, H is "A," "B," "C," "D," "E," "F," "G," "H," the above signals are obtained by expressions depicted below.

In the first pick-up device, as depicted in FIG. 1, the following expressions (1)–(6) are used, K1 being a fixed value:

$$RF = A+B+C+D \quad (\text{Exp. 1})$$

$$FE = \{(A+D)-(B+C)\}/(A+B+C+D) \quad (\text{Exp. 2})$$

$$TE = [(A+C)-(B+D)-K1\{(E-F)+(G-H)\}]/\{A+B+C+D+K1(E+F+G+H)\} \quad (\text{Exp. 3})$$

$$LP = [(A+C)-(B+D)+K1\{(E-F)+(G+H)\}]/\{A+B+C+D+K1(E+F+G+H)\} \quad (\text{Exp. 4})$$

$$TC = \{A+B+C+D-K1(E+F+G+H)\}/\{A+B+C+D+K1(E+F+G+H)\} \quad (\text{Exp. 5})$$

$$PP = \{(A+C)-(B+D)\}/(A+B+C+D) \quad (\text{Exp. 6})$$

In the second pick-up device, as depicted in FIG. 2, the following expressions (7)–(12) are used.

$$RF = A+B+C+D \quad (\text{Exp. 7})$$

$$FE = (A-B)/(A+B) \quad (\text{Exp. 8})$$

$$TE = [(C-D)-K1\{(E-F)+(G-H)\}]/\{C+D+K1(E+F+G+H)\} \quad (\text{Exp. 9})$$

$$LP = [(C-D)+K1\{(E-F)+(G-H)\}]/\{C+D+K1(E+F+G+H)\} \quad (\text{Exp. 10})$$

$$TC = \{C+D-K1(E+F+G+H)\}/\{C+D+K1(E+F+G+H)\} \quad (\text{Exp. 11})$$

$$PP = (C-D)/(C+D) \quad (\text{Exp. 12})$$

Comparing expressions (1)–(6) with expressions (7)–(12), for each respective signal, there are some obvious distinctions. For instance, the focusing error signal (FE) from expression (8) removes "C, D" from expression (2). The tracking error signal (TE) from expression (9) removes "A, B" from expression (3). The lens positional signal (LP) from expression (10) removes "A, B" from expression (4). The track cross signal (TC) from expression (11) removes "A, B" from expression (5). The push-pull signal (PP) from expression (12) removes "A, B" from expression (6).

Accordingly, a LSI which is capable of calculating the expressions (1)–(6) based on the outputs of each photo detector A, B, C, D, E, F, G, H on its input, and which is also capable of removing input data from C, D or A, B by a switching means, thereby calculating the expressions (7)–(12), is capable of responding to a first pick-up device (PU1) and a second pick-up device (PU2), each having a different respective photo detector arrangement.

Next, respective switching conditions for obtaining the focusing error signal (FE), the tracking error signal (TE), the lens positional signal (LP), the track cross signal (TC), and the push-pull signal (PP), will be described in connection with FIGS. 3–7.

Figure 3:
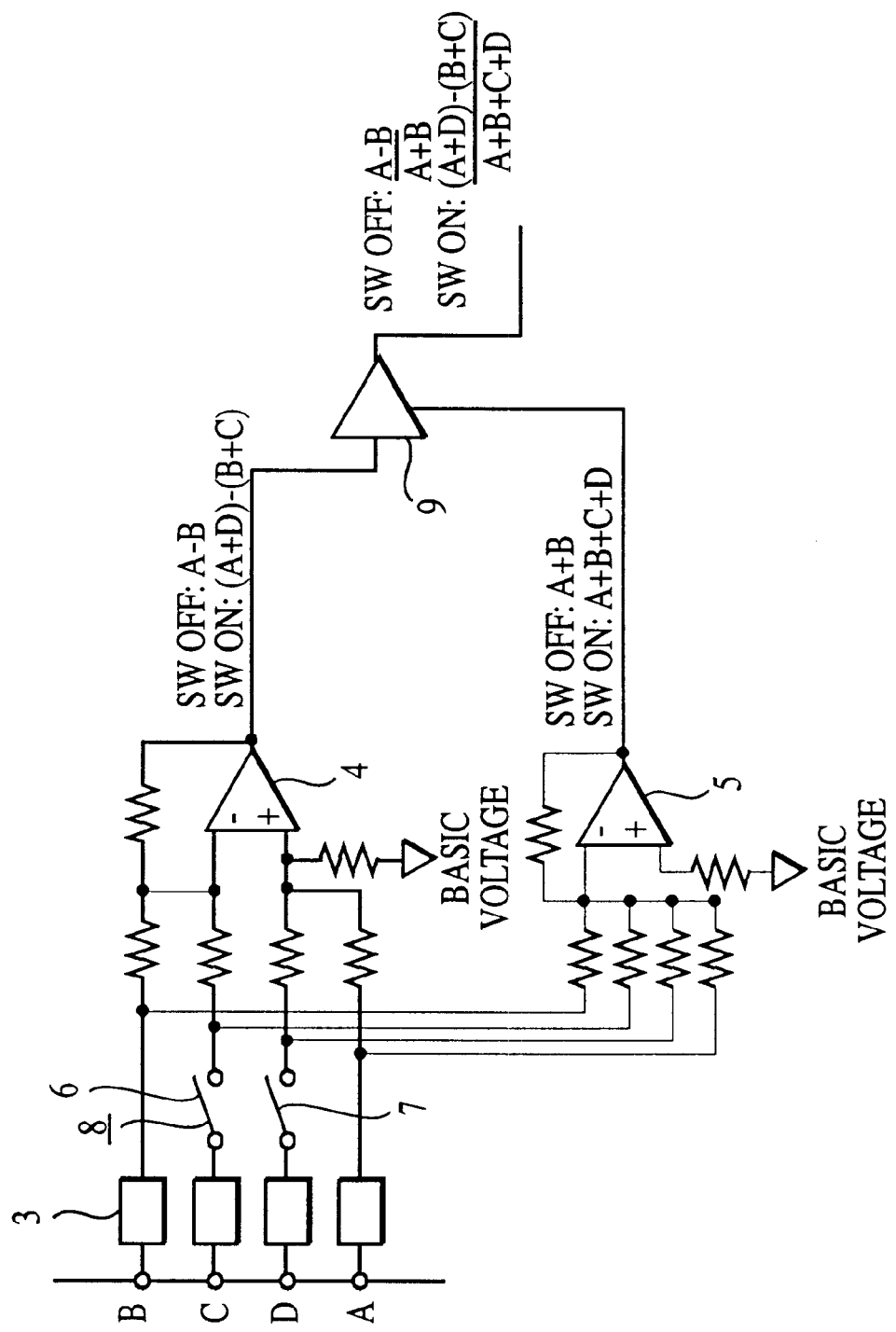
FIG. 3 depicts an operating circuit for calculating a focusing error signal (FE)

FIG. 3 depicts the calculation of the focusing error signal (FE) in which the photo detectors A, B, C, D are coupled to an operational amplifier 4 and an operational amplifier 5 through respective gain switching circuits 3 provided for each photo detector A, B, C, D. A switching circuit 8 comprising switches 6, 7 is provided in route portions of C, D between the gain switching circuits and the operational amplifiers 4, 5. Photo detectors A, D and a basic voltage are connected to a plus input portion of operational amplifier 4, and photo detectors B, C are connected to a minus input portion of operational amplifier 4. Furthermore, the basic voltage is connected to a plus input portion of the operational amplifier 5, and photo detectors A, B, C, D are connected to a minus input portion of operational amplifier 5. Output portions of the operational amplifiers 4, 5 are connected with a regulating circuit 9 acting as a dividing circuit.

When the FIG. 3 configuration is used in connection with the first pick-up device 1, switches 6, 7 are closed. Therefore, the output of the operational amplifier 4 is "(A+D)−(B+C)," and the output of the operational amplifier 5 is "A+B+C+D." These respective outputs are divided by the regulating circuit 9 resulting in an output of "FE={(A+D)−(B+C)}/(A+B+C+D)" (i.e., Exp. 2).

When the FIG. 3 configuration is used in connection with the second pick-up device (PU2), switches 6, 7 are opened. Therefore, inputs of C, D are cut and output of the operational amplifier 4 is "A−B," and output of the operational amplifier 5 is "A+B" resulting in an output of the regulating circuit of "FE=(A−B)/(A+B)" (i.e., Exp. 8).

Figure 4:
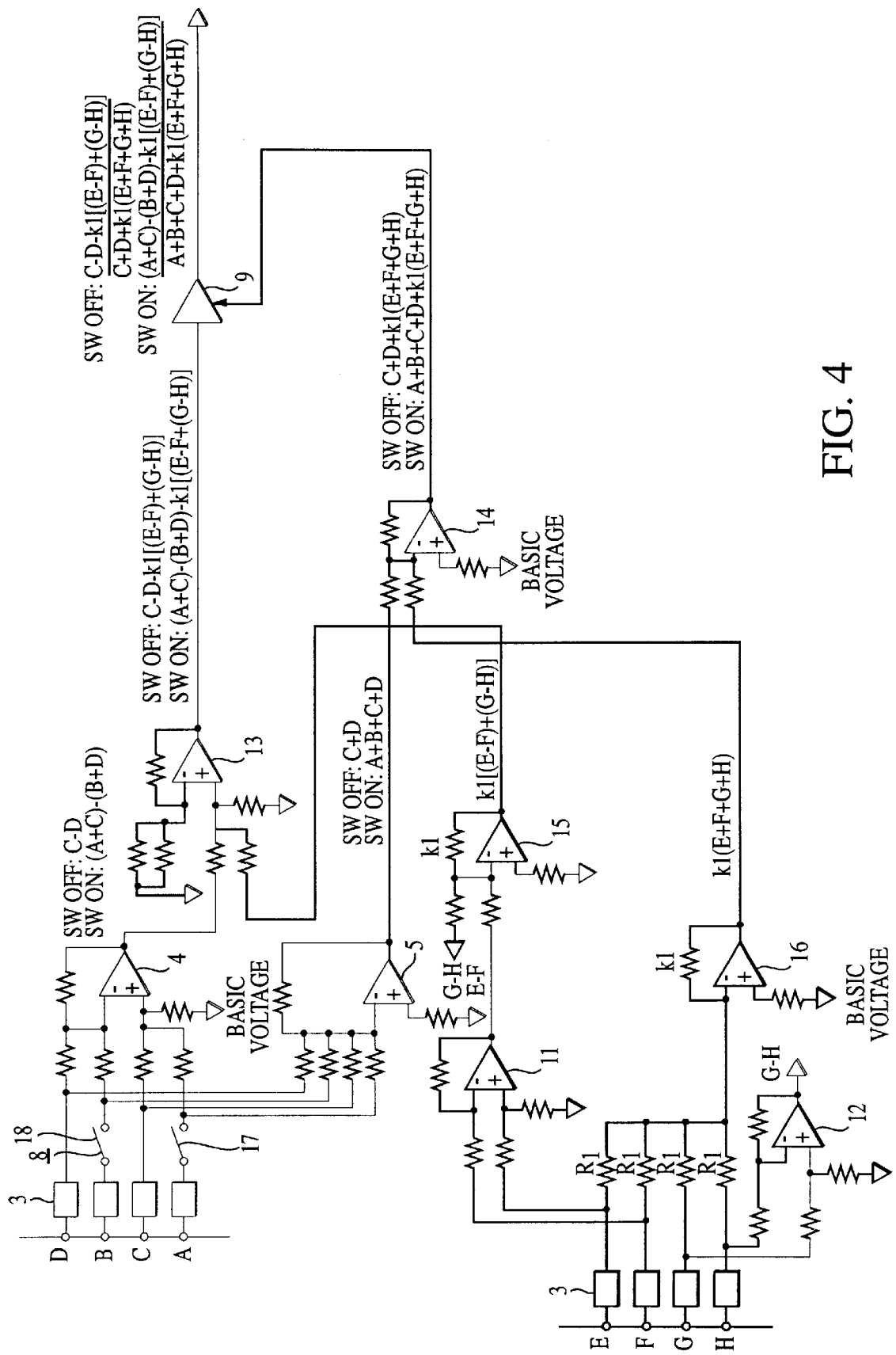
FIG. 4 depicts an operating circuit for calculating a tracking error signal (TE)

FIG. 4 depicts the calculation of the tracking error signal (TE) in which photo detectors A, B, C, D, E, F, G, H are coupled to operational amplifiers 4, 5, 11, 12 through respective gain switching circuits 3. Operational amplifier 4 is connected with regulating circuit 9 through operational amplifier 13, and operational amplifier 5 is connected with regulating circuit 9 through operational amplifier 14. Operational amplifier 11 is connected with operational amplifier 13 through operational amplifier 15, and operational amplifier 12 is connected with operational amplifier 14 through operational amplifier 15. The switching circuit 8 has switches 17, 18, these switches 17, 18 are connected through routes of photo detectors A, B.

When the FIG. 4 configuration is used in connection with the first pick-up device (PU1), switches 17, 18 are closed. Therefore, the output of operational amplifier 4 is "(A+C)−(B+D)," the output of the operational amplifier 15 is added to it by the operational amplifier 13. Operational amplifier 15 connects with the operational amplifier 11, outputting "E−F," and the operational amplifier 12, outputting "G−H". Multiplying it by K1, the output of operational amplifier 15 becomes "K1{(E−F)+(G−H)}" and is the input to operational amplifier 13. Therefore, the output of operational amplifier 13 is "(A+C)−(B+D)−K1(E−F)+(G−H)" and is the input to regulating circuit 9. On the other hand, the output of the operational amplifier 5 is "A+B+C+D" and this output is the input to the operational amplifier 14. The output of the operational amplifier 16 is "K1(E+F+G+H)." Adding that sum to the input of operational amplifier 14, the output of the operational amplifier 14 becomes "{A+B+C+D+K1(E+F+G+H)}" and is the input to the regulating circuit 9. Therefore, output of the regulating circuit 9 is "TE={(A+C)−(B+D)−K1{(E−F)+(G−H)}]/{A+B+C+D+K1(E+F+G+H)}" (i.e., Exp. 3).

When the FIG. 4 configuration is used in connection with the second pick-up device (PU2), switches 17, 18 are opened. The output of the operational amplifier 4 is "C–D." It is added to the output of the operational amplifier 15 in the operational amplifier 13. The operational amplifier 11, outputting "E–F," and the operational amplifier 12, outputting "G–H," are connected with this operational amplifier 15 and multiplied by K1. Therefore, the output of the operational amplifier 15 is "K1{(E–F)+(G–H)}," and it is an input to the operational amplifier 13. The output of the operational amplifier 13 is "(C–D)–K1{(E–F)+(G–H)}" and is an input to the regulating circuit 9. On the other hand, the output of the operational amplifier 5 is "C+D" and is an input to the operational amplifier 14. The output of the operational amplifier 16 is "K1(E+F+G+H)." They are added in the operational amplifier 14, and the output of the operational amplifier 14 is "{C+D+K1(E+F+G+H)}" and is input to the regulating circuit 9. Therefore, the output of the regulating circuit 9 is "TE=[(C–D)–K1{(E–F)+(G–H)}]/{C+D+K1(E+F+G+H)}" (i.e., Exp. 9).

Figure 5:
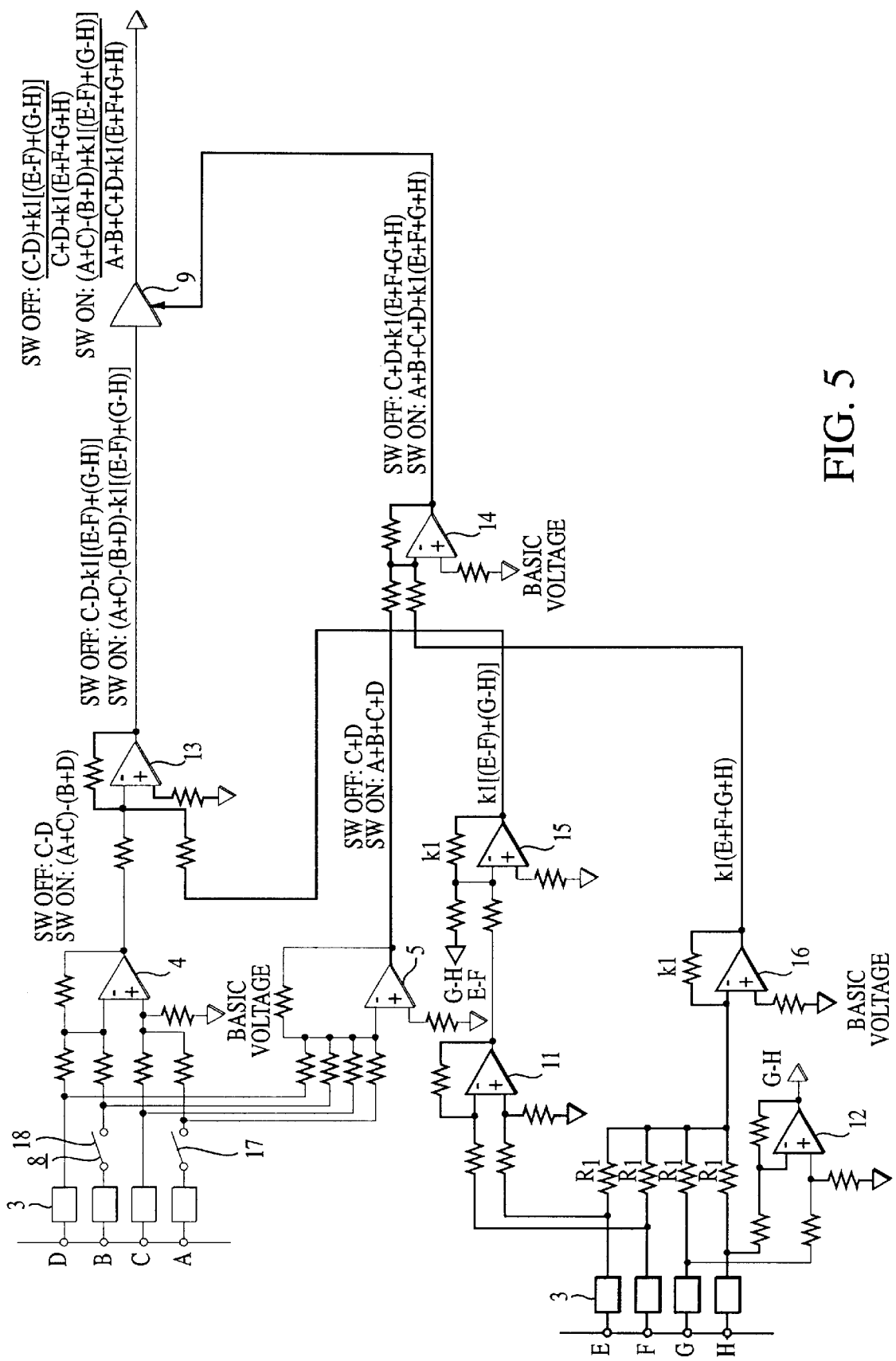
FIG. 5 depicts an operating circuit for calculating a lens positional signal (LP)

FIG. 5 depicts the calculation of the lens positional signal (LP) in which, unlike the FIG. 4 configuration, the basic voltage is the only input connected with the plus input portion of the operational amplifier 13. The FIG. 5 configuration also differs from the FIG. 4 configuration only in the connections between operational amplifiers 13, 15, and 4. In all other respects, FIG. 5 operates in a manner which is identical to FIG. 4. The FIG. 4 operational amplifier 13 subtracts the output of the operational amplifier 15 from the output of the operational amplifier 4. On the other hand, the operational amplifier 13, shown in FIG. 5, adds the output of the operational amplifier 15 to the output of the operational amplifier 4. Therefore, when using the first pick-up device (PU1), the output of the regulating circuit 9 is "LP=[(A+C)–(B+D)+K1{(E+F)+(G+H)}]/{A+B+C+D+K1(E+F+G+H)}" (i.e., Exp. 4). When using the second pick-up device (PU2), the output of the regulating circuit 9 is "LP=[(C–D)+K1{(E–F)+(G–H)}]/{C+D+K1(E+F+G+H)}" (i.e., Exp. 10).

Figure 6:
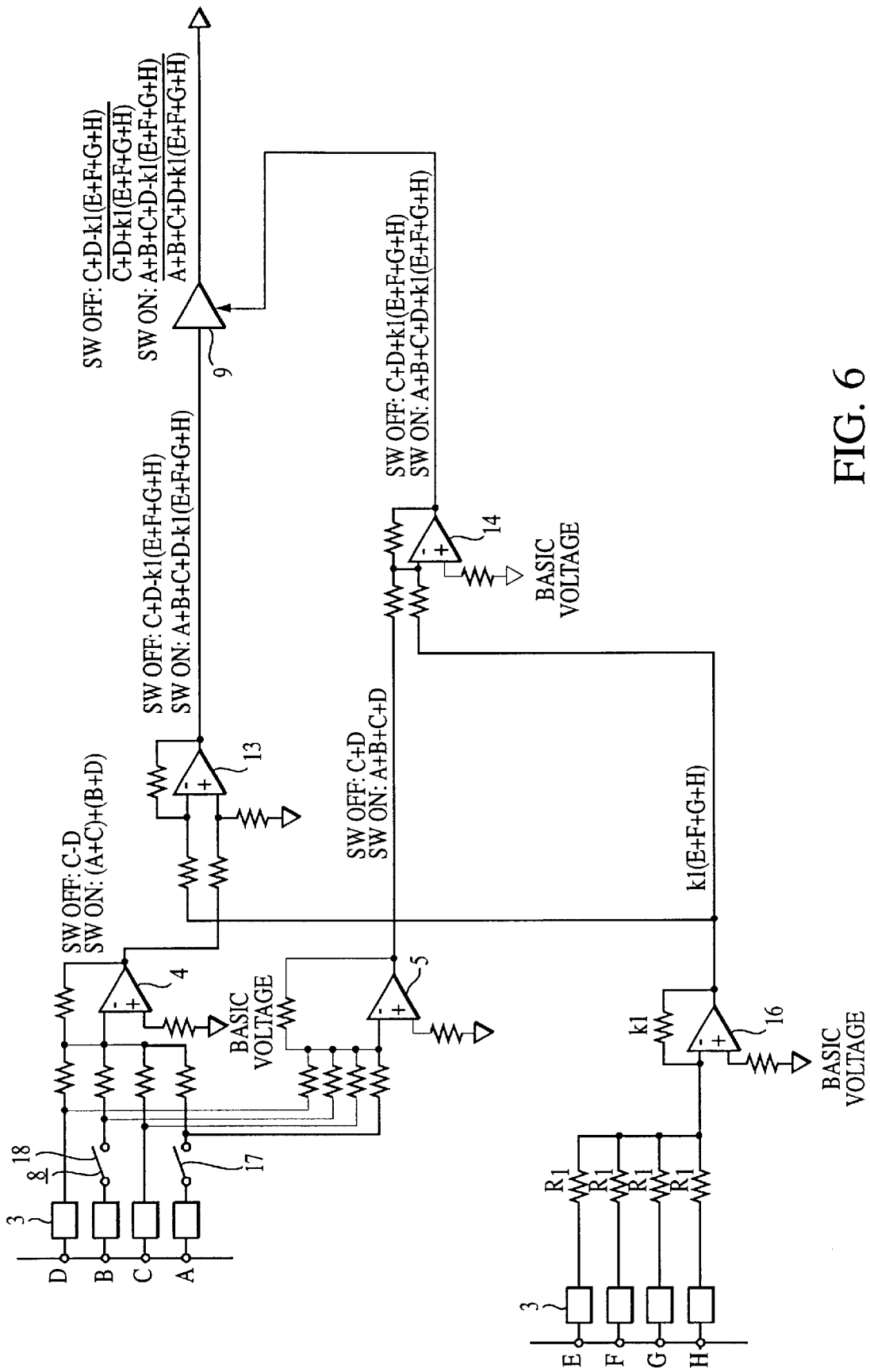
FIG. 6 depicts an operating circuit for calculating a track cross signal (TC)

FIG. 6 depicts the calculation of the track cross signal (TC). This configuration is identical to the FIG. 4 configuration with the exception of operational amplifiers 11, 12 and 15, which are not present. Therefore, numerators of the expression (3) and the expression (9) are different. When switches 17, 18 are closed, the output of the regulating circuit 9 is "TC={A+B+C+D–K1(E+F+G+H)}/{A+B+C+D+K1(E+F+G+H)}" (i.e., Exp. 5). When switches 17, 18 are opened, the output of the regulating circuit 9 is "TC={C+D"K1(E+F+G+H)}/{C+D+K1(E+F+G+H)}" (i.e., Exp. 11).

Figure 7:
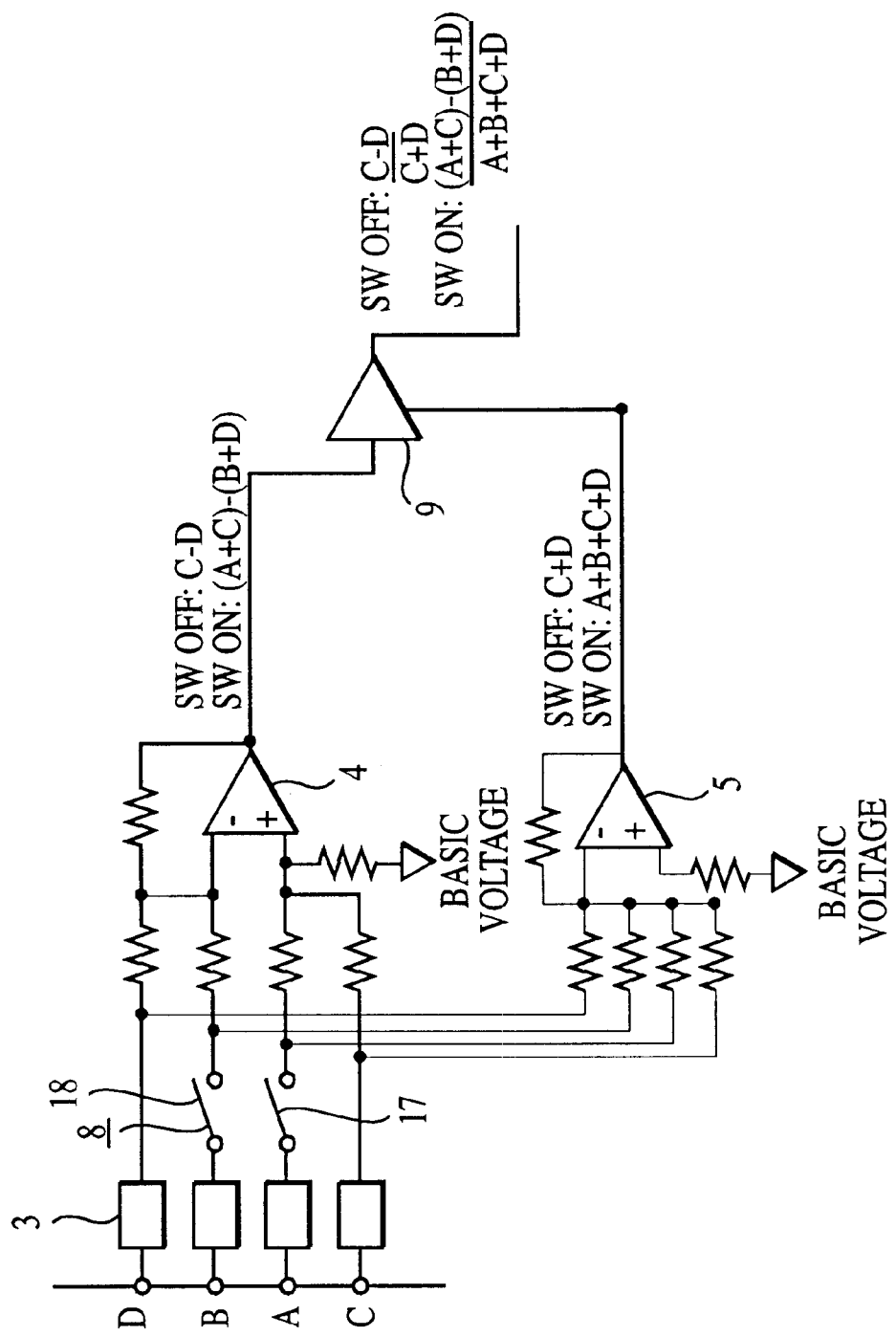
FIG. 7 depicts an operating circuit for calculating a push-pull signal (PP)

FIG. 7 depicts the calculation of the push pull signal (PP). This configuration is identical to the FIG. 3 configuration except that in FIG. 7, switches 17, 18 are connected with photo detectors A, B, and photo detectors A, C are connected with the plus input portion of the operational amplifier 4. Photo detectors B, D are connected with the minus input portion of operational amplifier 4. When using the first pick-up device (PU1), switches 17, 18 are closed. Therefore, the output of the operational amplifier 4 is "(A+C)–(B+D)," and the output of the regulating circuit 9 is "PP={(A+C)–(B+D)}/(A+B+C+D)" (i.e., Exp. 6). When using the second pick-up device (PU2), switches 17, 18 are opened. Therefore, the output of the operational amplifier 4 is "C–D" and the output of the regulating circuit 9 is "PP=(C–D)/(C+D)" (i.e., Exp. 12).

In accordance with the present invention, the calculating circuit, comprising the above operational amplifiers 4, 5, 11, 12, 13, 14, 15, 16, and the regulating circuit 9 are integrated and manufactured as a LSI. Each switch 6, 7, 17, 18 of the switching circuit 8 is connected with such LSI. Therefore, by opening or closing these switches 6, 7, 17, 18, the respective calculating operation of expressions (1)–(6) and the respective calculating operation of expressions (7)–(12) may be selectively carried out. Accordingly, the LSI is used commonly for both pick-up devices.

Pick-up devices 1, 2 may or may not have a gain changing function. In pick-up devices without a gain changing function, there are cases in which signals are too little so as to be impossible to detect, or signals can not be detected because they are too great and saturate the detection instrumentality. Therefore, in the present embodiment, gain is changed by the gain changing circuit 3 provided with each signal line. This gain change is carried out in two steps for the reproduction of each disc, for the recording of a CD-R disc, and for recording or erasing a CD-RW disc. For example, in reproducing each disc (CD-ROM, CD-R, CD-DA, CD-RW), the gain ratio is ×25. In recording a CD-R disc or recording and erasing a CD-RW disc, the gain ratio is ×1.

In the above embodiment, the output from the OEIC of the pick-up device is divided into eight separate signals, A, B, C, D, E, F, G, H. However, since E and G, and F and H are always calculated by the same nature of poles, they can be calculated in the OEIC and it is unnecessary to have an operational circuit in the LSI.

Figure 8:
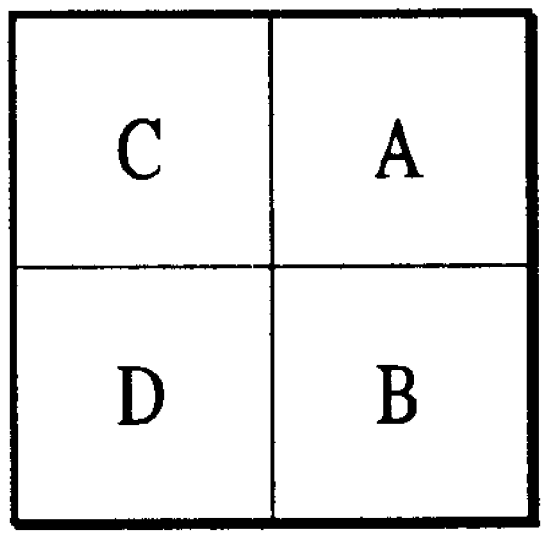
FIG. 8 depicts an arrangement of photo detectors for a one beam pick-up device.

Furthermore, arrangement of the photo detectors of the conventional one-beam pick-up device is shown in FIG. 8. Operational expressions are as follows:

$$FE=\{(A+D)-(B+C)\}/(A+B+C+D)$$

$$TE=\{(A+C)-(B+D)\}/(A+B+C+D)$$

$$RF=(A+B+C+D)$$

Since respective inputs "E, G, F, H" of the LSI are connected with basic voltage in FIG. 4, it is possible to correspond to the one-beam pick-up device by the same LSI.

Switches 6, 7 of FIG. 3, switches 17, 18 of FIGS. 4, 5, and 6 are opened. However, the same effect is obtained by connecting with the basic voltage but being off. Since there is no high impedance portion within the LSI, it is not susceptible to noise.

As previously described, a LSI forms the operational circuit which calculates a focusing error signal and a tracking error signal based on the output from plural photo detectors. A switching circuit is provided with the LSI and is adapted to the operational expressions of the respective pick-up devices by changing the output of them in the LSI input portion for each of the two types of pick-up devices used, each of which have a different arrangement of the photo detectors. Therefore, with only one LSI, it is possible to adapt to two or more kinds of pick-up devices by changing the switching circuit. It is also possible to simplify the operational expressions of the servo signals, and to easily adjust the signal amplitude level.

As previously described, the gain changing circuit which changes output gain of the photo detectors is connected with the input portion of the LSI; a calculating circuit which calculates the focusing error signal and the tracking error signal based on the output of the plural photo detectors. Therefore, although the pick-up devices do not change the gain, it is possible to perform operations on the photo detector signals.

As previously described, the gain changing circuit has two steps of reproducing, recording and erasing for each disc. Therefore, it is possible to perform operations on the photo detector signals and easily adapt to each disc.

While preferred embodiments of the invention have been described and illustrated, it should be apparent that many modifications can be made to the invention and the invention's application without departing from its spirit or scope. Accordingly, the invention is not limited by the foregoing description or drawings, but is only limited by the scope of the appended claims.

What is claimed as new and desired to be protected by Letters Patent of the United States is:

1. An apparatus for use with optical disk reproduction, the apparatus comprising:
   a calculating circuit for performing at least one arithmetic operation on signals received from either a first or a second plurality of photo detectors so as to calculate at least one servo signal, an input of said calculating circuit being respectively connectable to an output of said first and said second plurality of photo detectors; and
   at least one switch for changing a coupling path to said input of said calculating circuit.

2. The apparatus as in claim 1 further comprising a plurality of gain switching circuits for changing a gain level of signals received at an input of each of said plurality of gain switching circuits, an input of each of said plurality of gain switching circuits being respectively connectable to an output of each of said first plurality of photo detectors, said input of each of said plurality of gain switching circuits also being respectively connectable to an output of each of said second plurality of photo detectors.

3. The apparatus as in claim 2, wherein each of said plurality of gain changing circuits has two steps of reproducing, recording and erasing for each disk.

4. The apparatus as in claim 2 further comprising at least one divider, a first input of said divider being coupled to an output of a first one of said at least two operational amplifiers, a second input of said divider being coupled to an output of a second one of said at least two operational amplifiers.

5. The apparatus as in claim 1, wherein said at least one switch changes a connection between an output of at least one of said photo detectors and said input of said calculating circuit.

6. The apparatus as in claim 1, wherein said apparatus comprises a large scale integrated circuit (LSI).

7. The apparatus as in claim 6, wherein said LSI comprises an analog signal operational LSI.

8. The apparatus as in claim 1, wherein said first and second pluralities of photo detectors further comprise respectively a first and second pick-up device.

9. The apparatus as in claim 1, wherein said calculating circuit comprises at least two operational amplifiers.

10. The apparatus as in claim 1, wherein said apparatus is configured for calculating a reproducing signal.

11. The apparatus as in claim 1, wherein said apparatus is configured for calculating a focusing error signal.

12. The apparatus as in claim 1, wherein said apparatus is configured for calculating a tracking error signal.

13. The apparatus as in claim 1, wherein said apparatus is configured for calculating a lens positional signal.

14. The apparatus as in claim 1, wherein said apparatus is configured for calculating a track cross signal.

15. The apparatus as in claim 1, wherein said apparatus is configured for calculating a push-pull signal.

16. The apparatus as in claim 1, wherein each of said first and second pluralities of photo detectors further comprise an optical element integrated circuit.

17. A method of reproducing an optical disk, the method comprising:
    choosing from at least a first or a second plurality of photo detectors from which output signals are to be processed;
    choosing a path for said output signals, said path being dependent upon which plurality of photo detectors has been selected;
    performing at least one arithmetic operation on said output signals so as to calculate at least one servo signal.

18. The method as in claim 17 further comprising changing a gain level of said output signals received from a selected one of said plurality of photo detectors.

19. The method as in claim 17 further comprising:
    performing said at least one arithmetic operation on at least a first pair of output signals received from a selected one of said pluralities of photo detectors, and
    also performing said at least one arithmetic operation on at least a second pair of output signals received from a selected one of said pluralities of photo detectors.

20. The method as in claim 19 further comprising dividing a result reached by performing said arithmetic operation on said first pair of output signals by a result reached by performing said arithmetic operation on said second pair of output signals.

21. The method as in claim 17, wherein said act of performing further comprises calculating a reproducing signal.

22. The method as in claim 17, wherein said act of performing further comprises calculating a focusing error signal.

23. The method as in claim 17, wherein said act of performing further comprises calculating a tracking error signal.

24. The method as in claim 17, wherein said act of performing further comprises calculating a lens positional signal.

25. The method as in claim 17, wherein said act of performing further comprises calculating a track cross signal.

26. The method as in claim 17, wherein said act of performing further comprises calculating a push-pull signal.

* * * * *